US008866747B2

(12) United States Patent
Ladouceur et al.

(10) Patent No.: US 8,866,747 B2
(45) Date of Patent: Oct. 21, 2014

(54) ELECTRONIC DEVICE AND METHOD OF CHARACTER SELECTION

(75) Inventors: Norman Miner Ladouceur, Wingham (CA); Jason Tyler Griffin, Kitchener (CA)

(73) Assignee: BlackBerry Limited, Waterloo (CA)

( * ) Notice: Subject to any disclaimer, the term of this patent is extended or adjusted under 35 U.S.C. 154(b) by 108 days.

(21) Appl. No.: 13/234,591

(22) Filed: Sep. 16, 2011

(65) Prior Publication Data

US 2013/0069882 A1    Mar. 21, 2013

(51) Int. Cl.
| G09G 5/10 | (2006.01) |
| G06F 3/041 | (2006.01) |
| G06F 3/023 | (2006.01) |
| G06F 3/0488 | (2013.01) |

(52) U.S. Cl.
CPC ...... *G06F 3/0233* (2013.01); *G06F 2203/0381* (2013.01); *G06F 3/0488* (2013.01)
USPC ............ 345/169; 345/168; 345/172; 345/173

(58) Field of Classification Search
USPC ......... 345/158, 168, 169, 172–178, 156, 619; 715/773, 864; 341/20, 22, 23
See application file for complete search history.

(56) References Cited

U.S. PATENT DOCUMENTS

| 2002/0014395 A1* | 2/2002 | Walker .......................... 200/5 R |
| 2003/0193418 A1 | 10/2003 | Shi |
| 2005/0093846 A1 | 5/2005 | Marcus et al. |
| 2006/0190836 A1 | 8/2006 | Ling Su et al. |
| 2007/0013650 A1* | 1/2007 | Ladouceur .................... 345/156 |
| 2007/0247436 A1 | 10/2007 | Jacobsen |
| 2008/0316178 A1 | 12/2008 | Caliksan et al. |
| 2009/0174669 A1 | 7/2009 | Shkolnikov |
| 2011/0316784 A1* | 12/2011 | Bisutti et al. .................. 345/168 |
| 2012/0019471 A1* | 1/2012 | Schlipf ......................... 345/173 |
| 2012/0235919 A1* | 9/2012 | Earnshaw et al. ............. 345/169 |
| 2013/0050125 A1* | 2/2013 | Sudo ............................. 345/173 |

FOREIGN PATENT DOCUMENTS

| EP | 2178277 A1 | 4/2010 |
| WO | 2010123485 A2 | 10/2010 |

OTHER PUBLICATIONS

Extended European Search Report dated Feb. 8, 2012, issued from the corresponding European patent application No. 11181697.1.
Office Action dated May 21, 2014, issued in respect of corresponding European Application No. 11181697.1.

* cited by examiner

*Primary Examiner* — Kent Chang
*Assistant Examiner* — Nelson Rosario
(74) *Attorney, Agent, or Firm* — Geoffrey deKleine; Borden Ladner Gervais LLP

(57) ABSTRACT

A portable electronic device includes a plurality of physical keys, a touch-sensitive input device configured to detect a touch, and a processor coupled to the touch-sensitive input device, and the keys, and configured to, when no touch is detected on the touch-sensitive input device while a first key of the plurality of physical keys is selected, identify a first character associated with the first key, and when a touch is detected on the touch-sensitive input device while the first key is selected, identify a second character associated with the first key.

18 Claims, 5 Drawing Sheets

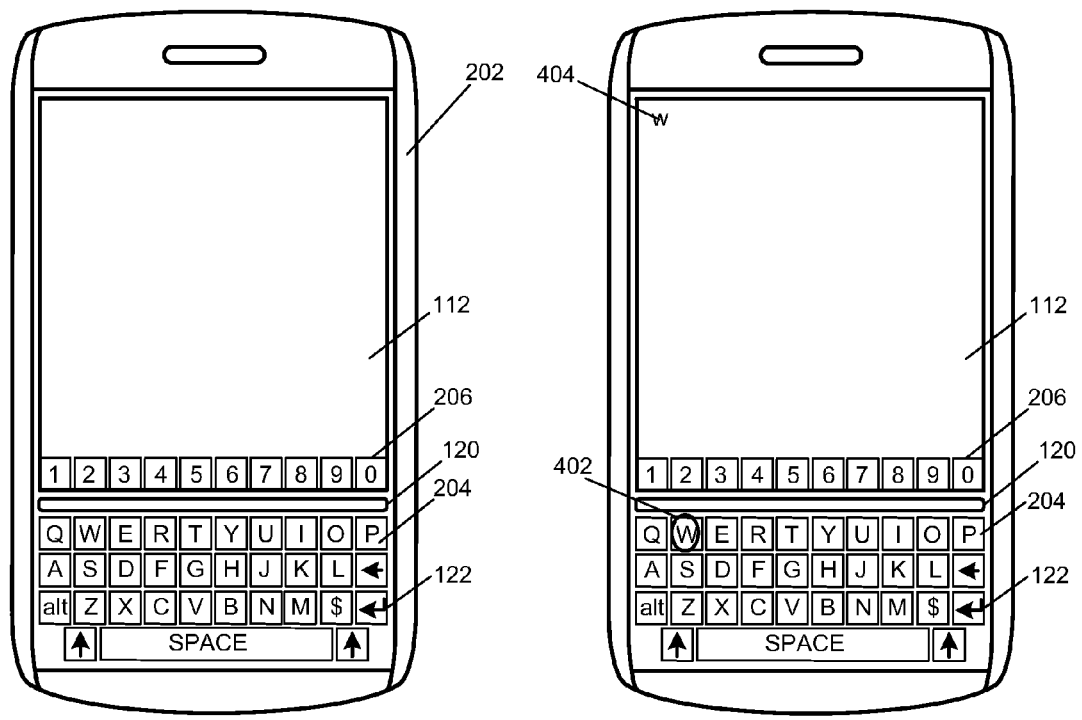
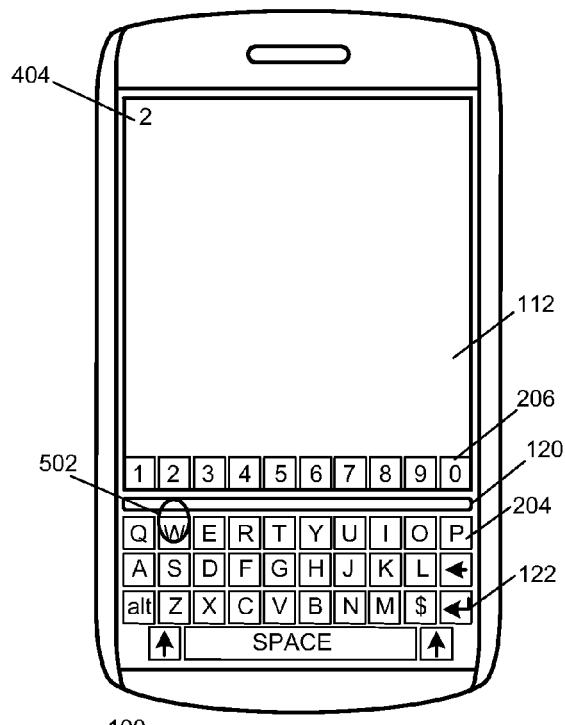

ELECTRONIC DEVICE AND METHOD OF CHARACTER SELECTION

FIELD OF TECHNOLOGY

The present disclosure relates to electronic devices including, but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. Such devices may therefore be small and may have limited space for user input and output.

Improvements in electronic devices are desirable.

BRIEF DESCRIPTION OF THE DRAWINGS

FIG. 2 is a front view of an example of a portable electronic device in accordance with the disclosure.

FIG. 4 through FIG. 11 illustrate examples of selection of characters by a portable electronic device in accordance with the disclosure.

DETAILED DESCRIPTION

Figure 1:
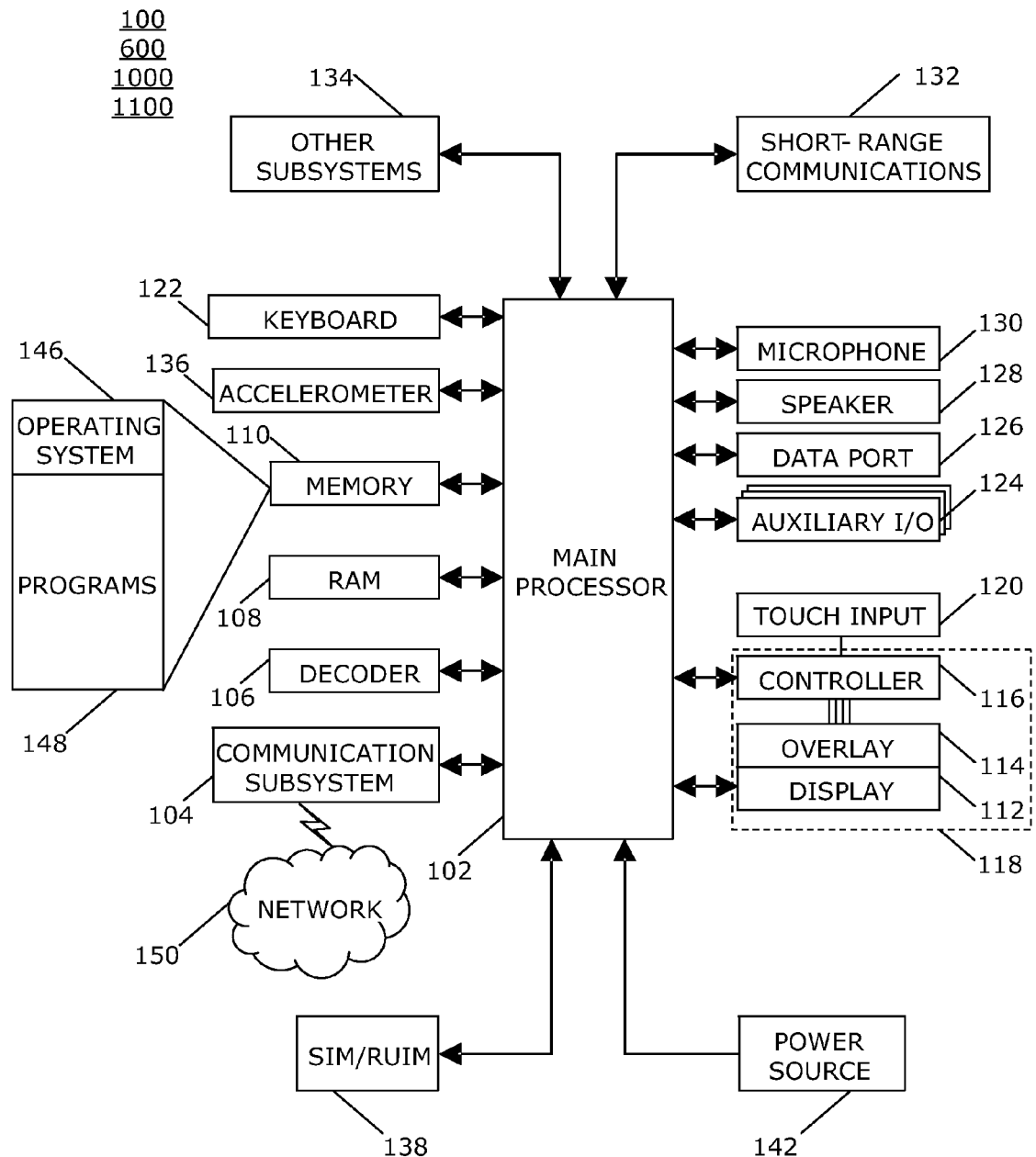
FIG. 1 is a block diagram of a portable electronic device in accordance with the disclosure.

The following describes a method and an electronic device that includes a plurality of physical keys, a touch-sensitive input device configured to detect a touch, and a processor coupled to the touch-sensitive input device, and the keys, and configured to, when no touch is detected on the touch-sensitive input device while a first key of the plurality of physical keys is selected, identify a first character associated with the first key, and when a touch is detected on the touch-sensitive input device while the first key is selected, identify a second character associated with the first key.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, and so forth. The portable electronic device may be a portable electronic device without wireless communication capabilities, such as handheld electronic games, digital photograph albums, digital cameras, media players, e-book readers, and so forth. Examples of non portable electronic devices include desktop computers, electronic white boards, smart boards utilized for collaboration, built-in monitors or displays in furniture or appliances, and so forth.

A block diagram of an example of a portable electronic device 100 is shown in FIG. 1. The portable electronic device 100, 600, 1000, 1100 includes multiple components, such as a processor 102 that controls the overall operation of the portable electronic device 100, 600, 1000, 1100. Communication functions, including data and voice communications, are performed through a communication subsystem 104. Data received by the portable electronic device 100, 600, 1000, 1100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100, 600, 1000, 1100.

The processor 102 interacts with other components, such as Random Access Memory (RAM) 108, memory 110, a display 112, one or more touch-sensitive input devices 120, a keyboard 122, an auxiliary input/output (I/O) subsystem 124, a data port 126, a speaker 128, a microphone 130, short-range communications 132, and other device subsystems 134. In the example illustrated in FIG. 1, the display 112 is part of a touch-sensitive display 118. Input via a graphical user interface may be provided via the touch-sensitive display 118. User-interaction with a graphical user interface may be performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an accelerometer 136 that may be utilized to detect direction of gravitational forces or gravity-induced reaction forces.

To identify a subscriber for network access, the portable electronic device 100, 600, 1000, 1100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100, 600, 1000, 1100 includes an operating system 146 and software programs, applications, or components 148 that are executed by the processor 102 and are typically stored in a persistent, updatable store such as the memory 110. Additional applications or programs may be loaded onto the portable electronic device 100, 600, 1000, 1100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100, 600, 1000, 1100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. When a touch begins, one or more signals are provided to the controller 116 and the origin of the touch may be determined from the signals. The origin may be a point or an area, for example. Signals may be provided to the controller at regular intervals in time for a touch, also known as sampling, such that changes in location of the touch may be detected. A touch on the touch-sensitive display or touch-sensitive input device 120 may be detected from any suitable input member, such as a finger, thumb, appendage, or other objects, for example, a stylus, pen, or other pointer, depending on the nature of the touch-sensitive display 118. The controller 116 and/or the processor 102 may detect a touch by any suitable input member on the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 that begins at an origin point and continues to an end point. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A hover may be a touch at a location that is generally unchanged over a period of time or is associated with the same selection item for a period of time.

The touch-sensitive input device 120 may be any suitable touch-sensitive strip, such as a capacitive touch-sensitive strip. The touch-sensitive input device 120 may be part of the touch-sensitive display 118 or may be controlled by the same controller as the touch-sensitive display 118. A capacitive touch-sensitive strip includes one or more capacitive touch sensor layers separated by a substrate or other barrier. The capacitive touch-sensor layers may be disposed on a substrate and may be protected by an overlying cover. The capacitive touch sensor layers may be any suitable material, such as patterned indium tin oxide (ITO). Input via the graphical user interface may also be provided via the touch-sensitive input device 120. User-interaction with the graphical user interface may be performed utilizing the touch-sensitive input device 120. The processor 102 interacts with the touch-sensitive input device 120 via the electronic controller 116. Alternatively, the touch-sensitive input device 120 may be coupled to the processor 120 via a different controller.

One or more touches, also known as touch contacts or touch events, may be detected on the touch-sensitive input device 120. Optionally, the processor 102 may determine a location of a touch along the strip. When a touch begins on the touch-sensitive input device 120, one or more signals comprising touch data are provided to the controller 116. Signals may be provided to the processor 102 at regular intervals in time for a touch, also known as sampling, such that duration or an end of the touch may be determined or detected. Optionally, changes in location of the touch may be detected.

A front view of an example of the electronic device 100 is shown in FIG. 2. The electronic device 100 includes a housing 202 in which the touch-sensitive display 118, the touch-sensitive input device 120, and the keyboard 122 are disposed. The housing 202 encloses components such as the components shown in FIG. 1.

The keyboard 122 is a physical keyboard and includes a plurality of physical keys 204 in the example of FIG. 2. The keys 204 may be mechanical keys that provide tactile feedback to a user when any of the keys 204 are depressed. Such mechanical keys may include, for example, mechanical switches disposed under keycaps. Alternatively, the keys 204 may include other actuators disposed under keycaps to provide tactile feedback. In the example illustrated in FIG. 2, the keyboard is a QWERTY keyboard. Other keyboards such as QWERTZ or AZERTY keyboards may be utilized.

The touch-sensitive input device 120 is shown as a strip that extends the width of the keyboard 122 above a top row of keys 204. The terms top, bottom, upper, and lower are utilized to provide reference to the orientation of the electronic device 100 in the figures and are not otherwise limiting. The touch-sensitive input device 120 is shown spaced from the keyboard 122 such that a thin strip of housing is disposed between the keyboard 122 and the touch-sensitive input device 120. The touch-sensitive input device 120 is disposed near the keyboard 122 such that a key 204 in the top row of the keyboard 122 may be depressed while touching the touch-sensitive input device 120. The input device 120 may be recessed in the housing 202 to reduce the occurrence of inadvertent touches on the touch-sensitive input device 120.

Characters 206 associated with both a key 204 and the touch-sensitive input device 120 are optionally displayed on the display 112. In the examples in FIG. 2, FIG. 4, FIG. 5, FIG. 6, and FIG. 7, the alternative characters are numbers, and the alternative character associated with each key 204 is displayed above the key, e.g., "1" is displayed above the Q key, "2" is displayed above the W key, "3" is displayed above the E key, and so forth. When a touch is detected on the touch-sensitive input device 120 while a key is selected, the alternative character is selected. For example, when a touch is detected on the touch-sensitive input device 120 while the Q key is selected, the alternative character "1" is selected. When no touch is detected on the touch-sensitive input device 120 while a key is selected, e.g., the Q key, the character associated with the Q key is selected, and "q" is entered. Displaying the characters facilitates selection of a character. Alternatively, the characters that are associated with the keys 204 and the touch-sensitive input device 120 may be displayed on the keys 204, on the thin strip of housing 202 between the keys 204 and the touch-sensitive input device 120, on the touch-sensitive input device 120, and so forth.

The present method facilitates entry of additional characters, such as numerals or symbols, other than the character associated with a key, during selection of a key without requiring a separate touch or depression of an additional key. A user may utilize the same finger to select the key and touch the touch-sensitive input device 120. Alternatively, a different finger may touch the touch-sensitive input device 120 than the finger depressing the key. Keys may be smaller, reducing the space utilized by the keyboard 122, because only a single character need be depicted on each keys.

Figure 3:
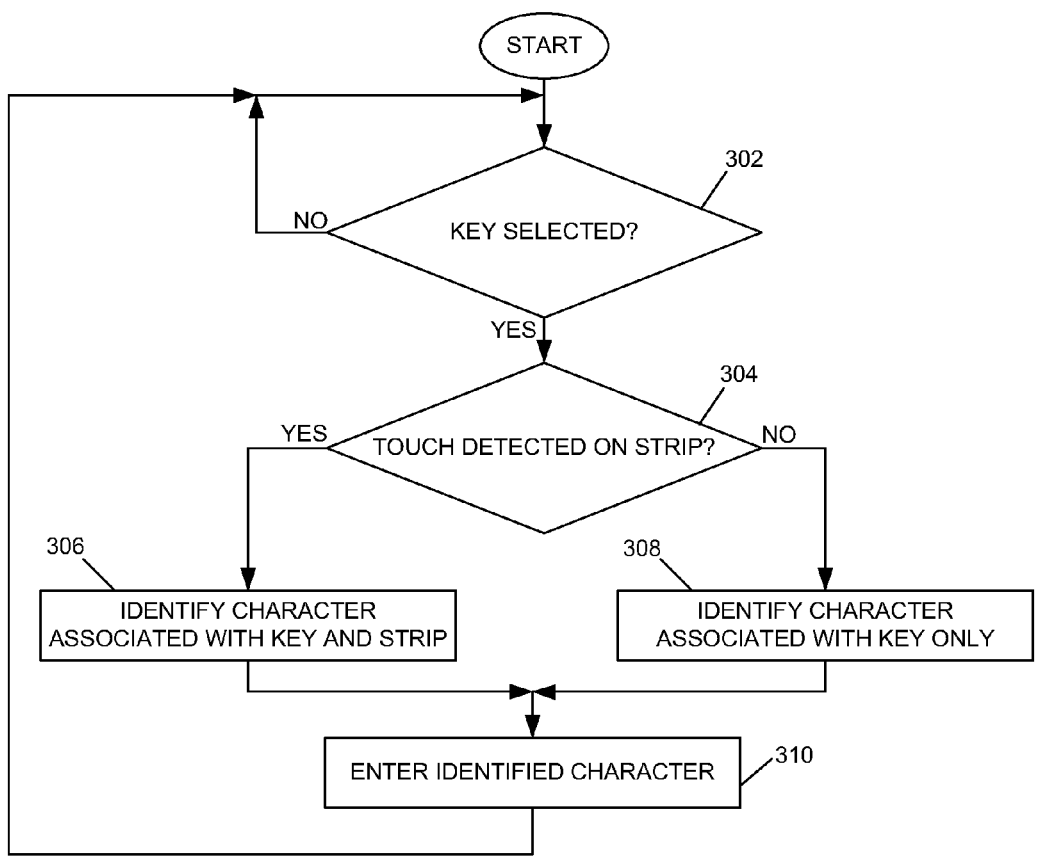
FIG. 3 is a flowchart illustrating a method of controlling a portable electronic device in accordance with the disclosure.

A flowchart illustrating a method of character selection and entry by an electronic device is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium. The process may be carried out in any suitable program or application in which characters are input, such as numbers, alphabet letters, numerals, symbols, punctuation, and so forth. Examples of suitable applications include email, text messaging, calendar, tasks, address book, map, Web browser, word processing, and so forth.

Figure 12:
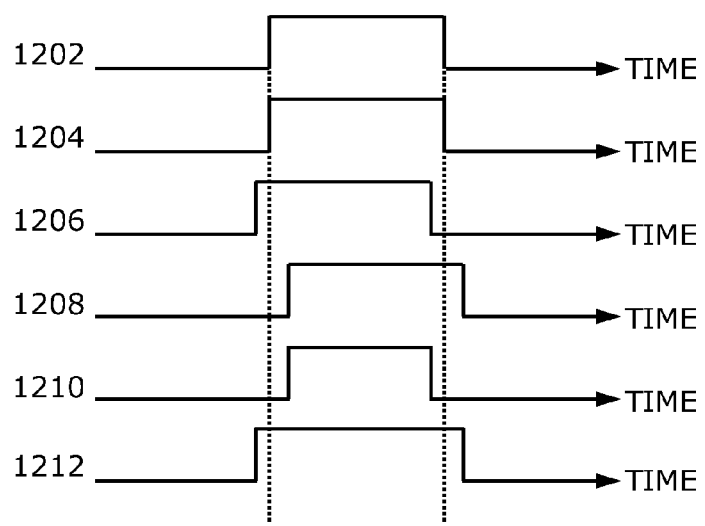
FIG. 12 illustrates timing diagrams showing when a touch is detected on a touch-sensitive input device while a key is selected in accordance with the disclosure

When one of the keys 204 is selected 302, the process continues at 304. A key is selected, for example, when input from the key is detected by or received by the processor 102 when the key is depressed or actuated. When a touch is detected on the touch-sensitive input device 120 while the key 204 is selected, as determined at 304, a character that is associated with both the key 204 and the touch-sensitive input device 120 is identified 306. The time when a touch is detected on the touch-sensitive input device 120 while the key 204 is selected includes any overlap in time of detection of a touch on the touch-sensitive input device 120 and detected depression of a key. The touch may be detected while the key 204 is depressed, e.g., after the key 204 is depressed and before the key 204 is released, before the key is depressed and continuing after depression, and so forth. Timing diagrams showing examples when touches are detected on a touch-sensitive input device while a key is selected are shown in FIG. 12. In the upper timing diagram, an example of a key selection 1202 is illustrated, where the higher level represents time while a key is selected. The lower diagrams show time when a touch is detected on a touch-sensitive input device, where the higher level represents time while a touch is detected. for example simultaneous detection of a touch 1204 with key selection, earlier detection of touch and release 1206 than key selection, later detection of touch and release 1208 than key selection, later detection of touch and earlier release 1210 than key selection, and earlier detection of touch and later release 1210 than key selection. When no touch on a touch-sensitive input device 120 is detected at any time while the key is depressed, no touch is detected while the key is selected. For example, when no touch is detected on a touch-sensitive input device during the time between the dotted vertical lines in FIG. 12, no touch is detected while the key is selected.

When a touch is not detected, i.e., no touch is detected, on the touch-sensitive input device 120 while the key 204 is depressed, a character associated with only the key 204 is identified 308.

The identified character is entered by displaying the identified character on the display 112. The character may be displayed, for example, in a data entry field 404 displayed on the display 112. Data entry fields include, for example, email address fields, email message fields, website address fields, and so forth, to name but a few.

Examples of entry of characters by an electronic device such as a portable electronic device are illustrated in FIG. 4 through FIG. 10. In the example shown in FIG. 4, a key is selected as illustrated by the ellipse 402 on the key 204 associated with the letter W. No touch is detected on the touch-sensitive input device 120 while the key 204 is selected, and the letter associated with the key is identified. In this example, the letter W is identified, and "w" is displayed on the display 112.

In the example shown in FIG. 5, the key associated with the letter W is selected, as illustrated by the ellipse 502. A touch is detected on the touch-sensitive input device 120 while the key 204 is selected, and the character associated with the key 204 and the touch-sensitive input device 120 is identified. In this example, the character associated with the key 204 and the touch-sensitive input device 120 is the number 2, and "2" is displayed on the display 112.

In the examples illustrated in FIG. 6 through FIG. 9, the portable electronic device 600 includes a plurality of touch-sensitive input devices. The plurality of touch-sensitive input devices include an upper touch-sensitive strip 660, and three lower touch-sensitive strips 662, 664, 668 in these examples. Alternatively, the three lower touch-sensitive strips may be a single strip. The strips may be any size or shape and may comprise any suitable number of distinct parts.

The upper touch-sensitive strip 660 extends the width of the keyboard 622, above the top row of keys. The upper touch-sensitive strip 660 is spaced from the keyboard 622 and is disposed near the keyboard 622 such that a key 604 in the top row of the keyboard 622 may be depressed while touching the touch-sensitive input device 660.

The lower touch-sensitive strips 662, 664, 666 include a touch-sensitive strip 662 that extends under the keys 604 associated with the "alt" function and the letter Z. Another touch-sensitive strip 666 extends under the keys associated with the return function and a symbol function. Located in between is a touch-sensitive strip 664 that extends under the remainder of the keys 604 in the bottom row of the keyboard 622. The touch-sensitive strips 662, 664, 666 are spaced from the keyboard 622 and are disposed near the keyboard 622 such that a key 604 in the bottom row of the keyboard 622 may be depressed while touching one of the touch-sensitive input devices 662, 664, 666.

Figure 6:
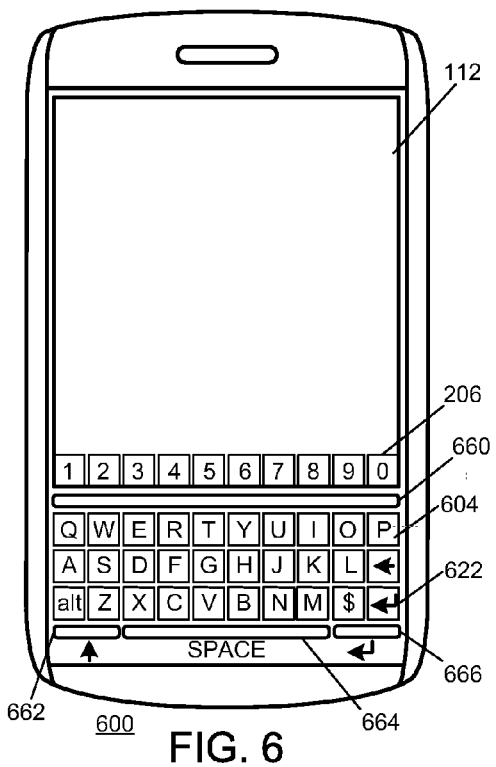

In the examples shown in FIG. 6 through FIG. 9, the characters that are associated with the top row of keys 604 and the upper touch-sensitive strip 660 are displayed along the bottom of the display 612 at locations that correspond to the keys 604 in the top row. The characters or functions that are associated with the keys 604 in the bottom row and the touch-sensitive strips 662, 664, 666 are displayed below the strips 662, 664, 666. Characters or functions may be associated with a plurality of the keys and one of the strips. For example, the space character in the example shown in FIG. 6 is associated with 6 keys and the touch-sensitive strip 664. The space character is identified when a touch is detected on the touch-sensitive strip 664 while any one of the 6 keys associated with the characters X, C, V, B, N, and M is selected.

Figure 7:
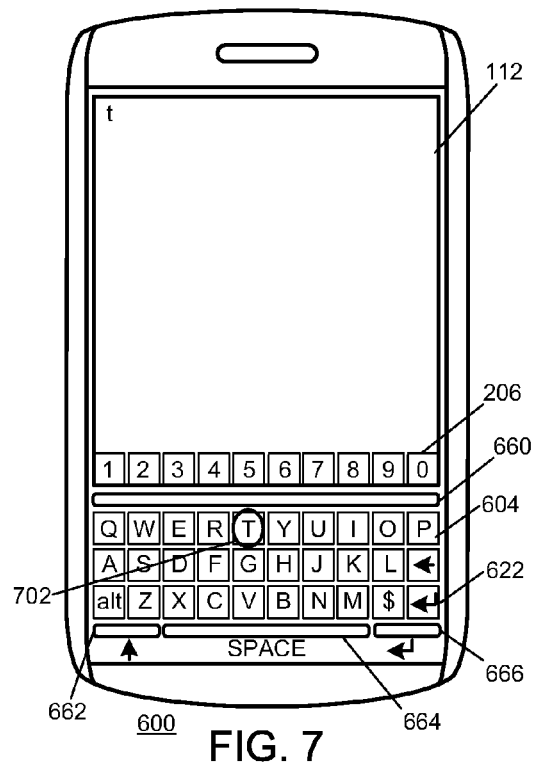

In the example shown in FIG. 7, a key is selected as illustrated by the ellipse 702 on the key 604 associated with the letter T. No touch is detected on the upper touch-sensitive strip 660 while the key 604 is selected and the letter associated with the key only is identified. In this example, the letter identified is the letter T, and "t" is displayed.

Figure 8:
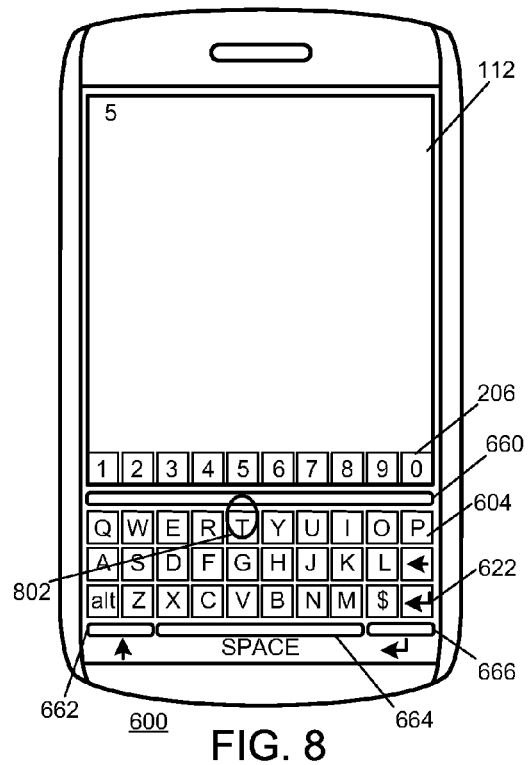

In the example shown in FIG. 8, the key associated with the letter T is selected, as illustrated by the ellipse 802. A touch is detected on the upper touch-sensitive strip 660 while the key 604 is selected, and the character associated with the key 604 and the upper touch-sensitive strip 660 is identified. In this example, the character associated with the key 604 and the upper touch-sensitive strip 660 is the number 5, and "5" is displayed.

Figure 9:
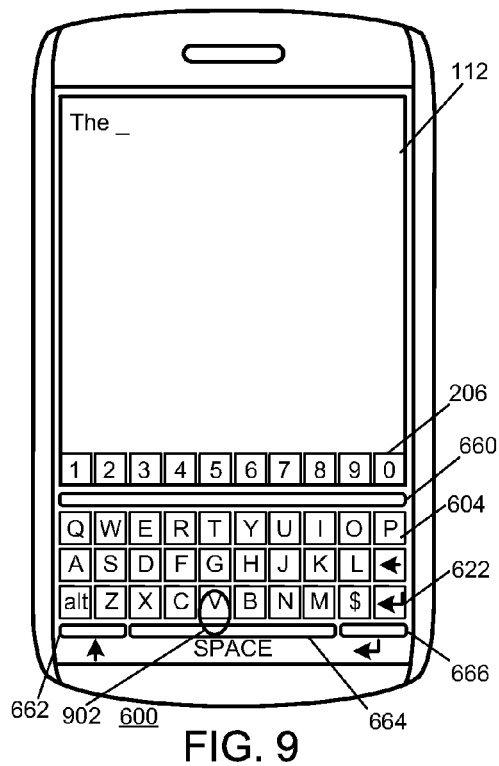

In the example shown in FIG. 9, the key associated with the letter V is selected, as illustrated by the ellipse 902. A touch is detected on the lower touch-sensitive strip 664 while the key 604 is selected, and the character associated with the key 604 and the lower touch-sensitive strip 664 is identified. In this example, the character associated with the key 604 and the lower touch-sensitive strip 664 is associated with the space, and a space character is entered on the display 612.

Figures 10, 11:
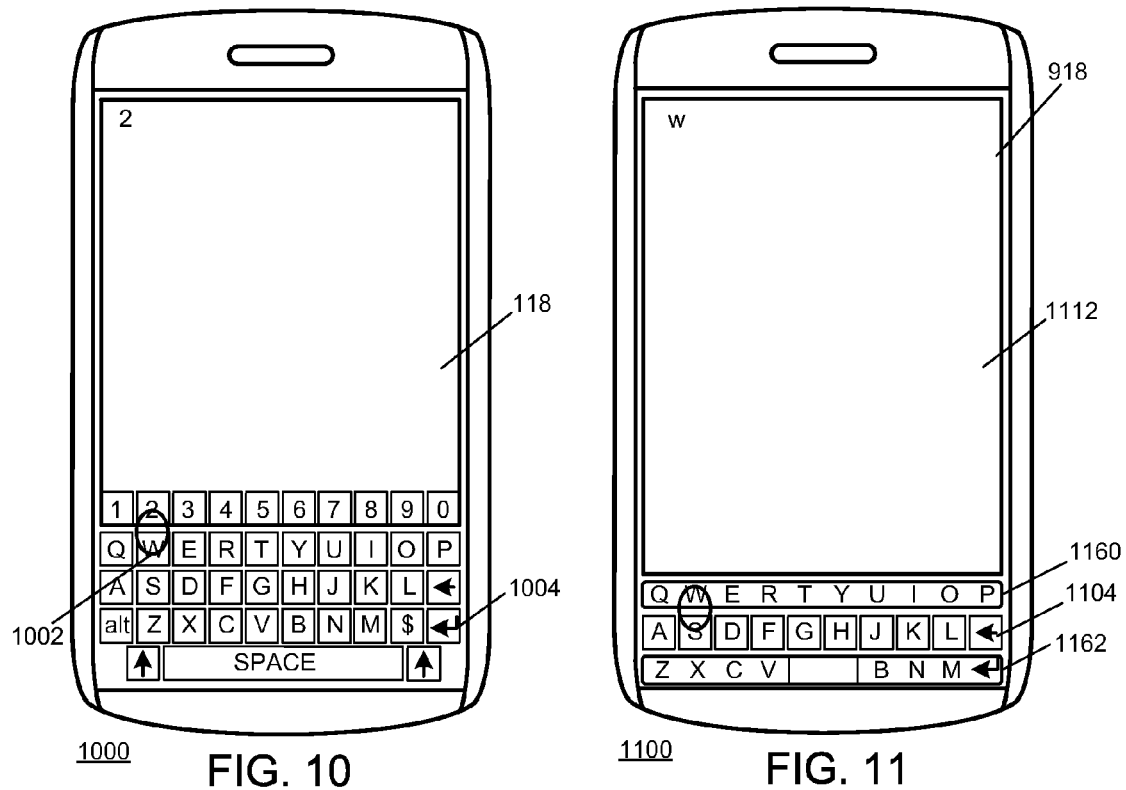

In the example illustrated in FIG. 10, the keys 1004 in the upper row of the keyboard are spaced from the touch-sensitive display 118 by a thin strip of housing, and the keys 1004 are near the touch-sensitive display 1018 such that the touch-sensitive display 118 may be touched while keys 1004 of the upper row of the keyboard are depressed. The portable electronic device 1000 does not include a separate touch-sensitive strip and the touch-sensitive display 1018 is utilized as the touch-sensitive input device for character input.

In the example shown in FIG. 10, the key 1004 associated with the letter W is selected, as illustrated by the ellipse 1002. A touch is detected on the touch-sensitive display 1018 while the key 1004 is selected, and the character associated with the key 1004 and the touch-sensitive display 1018 is identified. In this example, the character associated with the key 1004 and the touch-sensitive display 1018 is the number 2, and "2" is displayed.

Another example of character selection on a portable electronic device 1100 is illustrated in FIG. 11. In the example illustrated in FIG. 11, a single row of physical keys 1104 and two touch-sensitive input devices 1160, 1162 are provided. The two touch-sensitive input devices include an upper touch-sensitive strip 1160 and a lower touch-sensitive strip 1162.

The upper touch-sensitive strip 1160 extends the width of the row of keys 1104 and is located above the keys 1104. The upper touch-sensitive strip 1160 is spaced from the keys 1104 and is disposed near the keys 1104 such that the touch-sensitive input device 1160 may be touched while a key 1104 in the row is depressed.

The lower touch-sensitive strip 1162 extends the width of the row of keys 1104 and is located below the keys 1104. The lower touch-sensitive strip 1162 is spaced from the keys 1104 and is disposed near the keys 1104 such that the touch-sensitive input device 1162 may be touched while a key 1104 is depressed.

The single row of physical keys 1104 includes keys associated with the characters that are in the center row of a typical QWERTY keyboard. Other characters may be entered when a touch is detected on either the upper touch-sensitive strip 1160 or the lower touch-sensitive strip 1162, while a key 1104 is selected. For example, the letter S is entered when no touch is detected on either of the touch-sensitive strips 1160, 1162 while the key 1104 associated with the letter S is selected. The letter W is entered when a touch is detected on the upper touch-sensitive strip 1160 while the key 1104 associated with the letter S is selected. The letter X is entered when a touch is detected on the lower touch-sensitive strip 1162 while the key 1104 associated with the letter S is selected.

The displays 112 of the portable electronic devices illustrated in FIG. 2, FIG. 4 through FIG. 9, and FIG. 11 may, optionally be part of a touch-sensitive display 118, as described in relation to FIG. 1. The present disclosure is not limited to an electronic device that includes a touch-sensitive display, however. The present disclosure is also not limited to an electronic device that includes a display. The electronic device may be a device that does not include a display. For example, a remote control for use with another device, such as a television, may utilize any of the keyboards described with reference to FIG. 2 and FIG. 4 through FIG. 11 and the method of FIG. 3. In the example of an electronic device that does not include a display, a character may be entered 310, for example, by sending a signal to another device to select the character.

The size of a keyboard may be reduced utilizing touch-sensitive input devices along with the keys of the keyboard. Alternative characters are associated with physical keys and one or more touch-sensitive input devices. The alternative characters are optionally displayed to assist a user in identifying alternative characters. Tactile feedback is also provided during entry of characters, including characters that are associated with the touch-sensitive input device.

A portable electronic device includes a plurality of physical keys, a touch-sensitive input device configured to detect a touch, and a processor coupled to the touch-sensitive input device, and the keys, and configured to, when no touch is detected on the touch-sensitive input device while a first key of the plurality of physical keys is selected, identify a first character associated with the first key, and when a touch is detected on the touch-sensitive input device while the first key is selected, identify a second character associated with the first key. A method includes, in response to detecting selection of a first key of a plurality of keys, identifying a first character associated with the first key when no touch is detected on the touch-sensitive input device while the first key is selected, identifying a second character associated with the first key when a touch is detected on the touch-sensitive input device while the first key is selected.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. An electronic device comprising:
    a plurality of mechanical keys;
    a first touch-sensitive strip spaced by a distance from the plurality of mechanical keys and disposed along at least some of the plurality of mechanical keys and configured to detect a touch;
    a processor coupled to the first touch-sensitive strip and the mechanical keys and configured to:
        when no touch is detected on the first touch-sensitive strip while a first key of the plurality of mechanical keys is depressed, identify a first character associated with the first key;
        when a touch is detected on the first touch-sensitive strip while the first key is depressed, identify a second character associated with the first key;

wherein the first touch-sensitive strip is part of a touch-sensitive display, and
wherein the touch-sensitive display is located adjacent a row of the plurality of mechanical keys to facilitate, by a single touch, depression of any one of the mechanical keys while touching the touch-sensitive display.

2. The electronic device according to claim 1, wherein the first touch-sensitive strip extends along a row of the mechanical keys.

3. The electronic device according to claim 1, wherein the mechanical keys comprise keys of a keyboard.

4. The electronic device according to claim 1, wherein the second character associated with the first key is displayed at a location aligned with the associated first key.

5. The electronic device according to claim 1, comprising a second touch-sensitive strip, wherein the plurality of mechanical keys comprises at least one row of keys disposed between the first touch-sensitive strip and the second touch-sensitive strip.

6. The electronic device according to claim 1, comprising a second touch-sensitive strip, wherein when a touch is detected on the second touch-sensitive strip while the first key is depressed, a third character associated with the first key is identified.

7. The electronic device according to claim 1, wherein at least one of the plurality of mechanical keys is associated with at least three characters.

8. The electronic device according to claim 1, wherein the plurality of mechanical keys are arranged and constructed to provide tactile feedback when selected.

9. The electronic device according to claim 1, wherein the touch-sensitive strip extends a width of the row of the mechanical keys.

10. A method comprising:
detecting depression of a first key of a plurality of mechanical keys of an electronic device to select the first key;
in response to detecting depression of the first key:
identifying a first character associated with the first key when no touch is detected on a first touch-sensitive input device while the first key is depressed, wherein the first touch-sensitive input device comprises a touch-sensitive display that is spaced from and extends adjacent a row of the plurality of mechanical keys to facilitate, by a single touch, depression of any one of the mechanical keys of the row while touching the touch-sensitive display to select the first character;
identifying the second character associated with the first key when a touch is detected on the first touch-sensitive input device while the first key is depressed.

11. The method according to claim 10, comprising entering the identified character.

12. The method according to claim 10, wherein the second character is identified when the touch overlaps in time with the selection.

13. The method according to claim 10, wherein, when a touch is detected on a second touch-sensitive input device while the first mechanical key is depressed, a third character associated with the one of the plurality of mechanical keys is identified.

14. The method according to claim 10, comprising displaying the second character on a display of the electronic device.

15. A computer-readable storage device having computer-readable code executable by at least one processor of the electronic device to perform the method of claim 10.

16. An electronic device comprising:
a physical keyboard comprising mechanical keys arranged in a single row, wherein a first mechanical key of the mechanical keys is associated with a first character, a second character, and a third character;
a first touch-sensitive input device that extends along the single row, adjacent to and spaced from the physical keyboard and is configured to detect a touch;
a second touch-sensitive input device that extends along the single row, adjacent to and spaced from the physical keyboard and is configured to detect a touch;
a display configured to display the first character, the second character, and the third character associated with the first mechanical key;
a processor operably coupled to the display, the touch-sensitive input device, and the mechanical keys and configured to:
when no touch is detected on the first touch-sensitive input device during depression of the first mechanical key, select the first character associated with the first mechanical key;
when a touch is detected on the first touch-sensitive input device during depression of the first mechanical key, select the second character associated with the first mechanical key;
when a touch is detected on the second touch-sensitive input device during depression of the first mechanical key, select the third character associated with the first mechanical key.

17. The electronic device according to claim 16, wherein the first touch-sensitive strip is recessed in a housing of the electronic device to reduce the chance of inadvertent touching of the first touch-sensitive strip.

18. The electronic device according to claim 16, wherein the physical keyboard comprises a single row of mechanical keys.

* * * * *